United States Patent
Xi et al.

(10) Patent No.: US 9,942,319 B2
(45) Date of Patent: Apr. 10, 2018

(54) ASYNCHRONOUS DOWNLOAD FOR APPLICATION OFFLINE SUPPORT

(71) Applicants: Paul Xi, Mountain View, CA (US); Ming Zhu, Palo Alto, CA (US); Xiaojun Feng, Palo Alto, CA (US); Mohamed Elzankaly, Palo Alto, CA (US); Marco Eidinger, San Jose, CA (US); Ananda Kumar Gajula, Palo Alto, CA (US); Mario Linge, Mountain View, CA (US); Yang-cheng Fan, San Jose, CA (US); Oscar Marquez, Palo Alto, CA (US); Jianxun Zhou, Palo Alto, CA (US)

(72) Inventors: Paul Xi, Mountain View, CA (US); Ming Zhu, Palo Alto, CA (US); Xiaojun Feng, Palo Alto, CA (US); Mohamed Elzankaly, Palo Alto, CA (US); Marco Eidinger, San Jose, CA (US); Ananda Kumar Gajula, Palo Alto, CA (US); Mario Linge, Mountain View, CA (US); Yang-cheng Fan, San Jose, CA (US); Oscar Marquez, Palo Alto, CA (US); Jianxun Zhou, Palo Alto, CA (US)

(73) Assignee: SAP SE, Walldorf (DE)

( * ) Notice: Subject to any disclaimer, the term of this patent is extended or adjusted under 35 U.S.C. 154(b) by 964 days.

(21) Appl. No.: 14/249,229

(22) Filed: Apr. 9, 2014

(65) Prior Publication Data

US 2015/0296010 A1 Oct. 15, 2015

(51) Int. Cl.
*H04L 29/08* (2006.01)
*H04L 29/06* (2006.01)

(52) U.S. Cl.
CPC .......... *H04L 67/1095* (2013.01); *H04L 67/04* (2013.01); *H04L 67/2861* (2013.01); *H04L 67/32* (2013.01); *H04L 69/24* (2013.01)

(58) Field of Classification Search
CPC ..... H04L 67/1095; H04L 67/32; H04L 67/04; H04L 69/24; H04L 67/2861
See application file for complete search history.

(56) References Cited

U.S. PATENT DOCUMENTS 9,229,702 B1 * 1/2016 Kapulkin .................. G06F 8/65
2011/0093790 A1 * 4/2011 Maczuba .......... G06F 17/30902
715/745

(Continued)

*Primary Examiner* — Abdulkader M Alriyashi
(74) *Attorney, Agent, or Firm* — Fountainhead Law Group P.C.

(57) ABSTRACT

A technique is described providing offline support to business applications. Offline support allows a business application running on a portable electronic device without connectivity to a backend server to operate as though the business application has access to a backend server. The technique receives a sync request for content from the portable electronic device. A sync task is generated from the sync requests and processed to generate a package that contains the desired content. Once the package is generated, the package is stored in a package repository and a download notification is transmitted to the portable electronic device to notify the user that the package is ready. The package can in turn be delivered to the portable electronic device when a download request is received from the portable electronic device.

15 Claims, 6 Drawing Sheets

(56) References Cited

U.S. PATENT DOCUMENTS

| | | | |
|---|---|---|---|
| 2012/0079029 A1* | 3/2012 | Damola | H04L 12/66 709/204 |
| 2012/0297030 A1* | 11/2012 | Knobel | G06F 8/65 709/219 |
| 2014/0040195 A1* | 2/2014 | Elliott | G06F 17/30899 707/617 |
| 2014/0181030 A1* | 6/2014 | Wansbrough | G06F 17/30144 707/639 |

* cited by examiner

ASYNCHRONOUS DOWNLOAD FOR APPLICATION OFFLINE SUPPORT

BACKGROUND

In today's fast-paced business environment, users frequently travel around to conduct business. For example, a sales representative can visit many customer locations throughout the day. Due to the nature of the business, there can be periods of time during the day where the user has limited or no internet connectivity, thereby resulting in an inability to access important data stored on backend servers. This can result in lost productivity.

SUMMARY

In one embodiment, a computer-implemented method receives, from a portable electronic device, a sync request for content that corresponds with a user account of the portable electronic device, wherein the content is configured to allow the user account to operate the portable electronic device in an offline mode where the portable electronic device is not in communication with a computer system. The method then generates, by the computer system, a sync task in response to the sync request. The method then processes, by the computer system, the sync task to generate a package that contains the content. The method can then optionally store, by the computer system, the package in an offline repository, notify, by the computer system, the portable electronic device that the package is ready, receive, by the computer system, a download request from the portable electronic device, and transmitting, by the computer system, the package from the offline repository to the portable electronic device in response to the download request.

In another embodiment, a non-transitory computer readable storage medium stores one or more programs comprising instructions for receiving, from a portable electronic device, a sync request for content that corresponds with a user account of the portable electronic device, wherein the content is configured to allow the user account to operate the portable electronic device in an offline mode where the portable electronic device is not in communication with a computer system, generating a sync task in response to the sync request, and processing the sync task to generate a package that contains the content.

In another embodiment, a computer implemented system comprises one or more computer processors and a non-transitory computer-readable storage medium. The non-transitory computer-readable storage medium comprises instructions, that when executed, control the one or more computer processors to be configured for receiving, from a portable electronic device, a sync request for content that corresponds with a user account of the portable electronic device, wherein the content is configured to allow the user account to operate the portable electronic device in an offline mode where the portable electronic device is not in communication with a computer system, generating a sync task in response to the sync request, and processing the sync task to generate a package that contains the content.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments herein describe a system for providing offline support to business applications. Offline support allows a business application running on a portable electronic device to operate as though the business application has access to a backend server even when connectivity with the backend server does not exist for various reasons, such as poor connectivity due to the location of the portable electronic device or the portable electronic device does not offer wireless connectivity. In some embodiments, offline support can include techniques for downloading content from the backend server to be stored locally on the portable electronic device. This allows the business application to access the content even when the portable electronic device is not in communication with the backend server. The content that is downloaded to the portable electronic device can vary depending on implementation.

Figure 1:
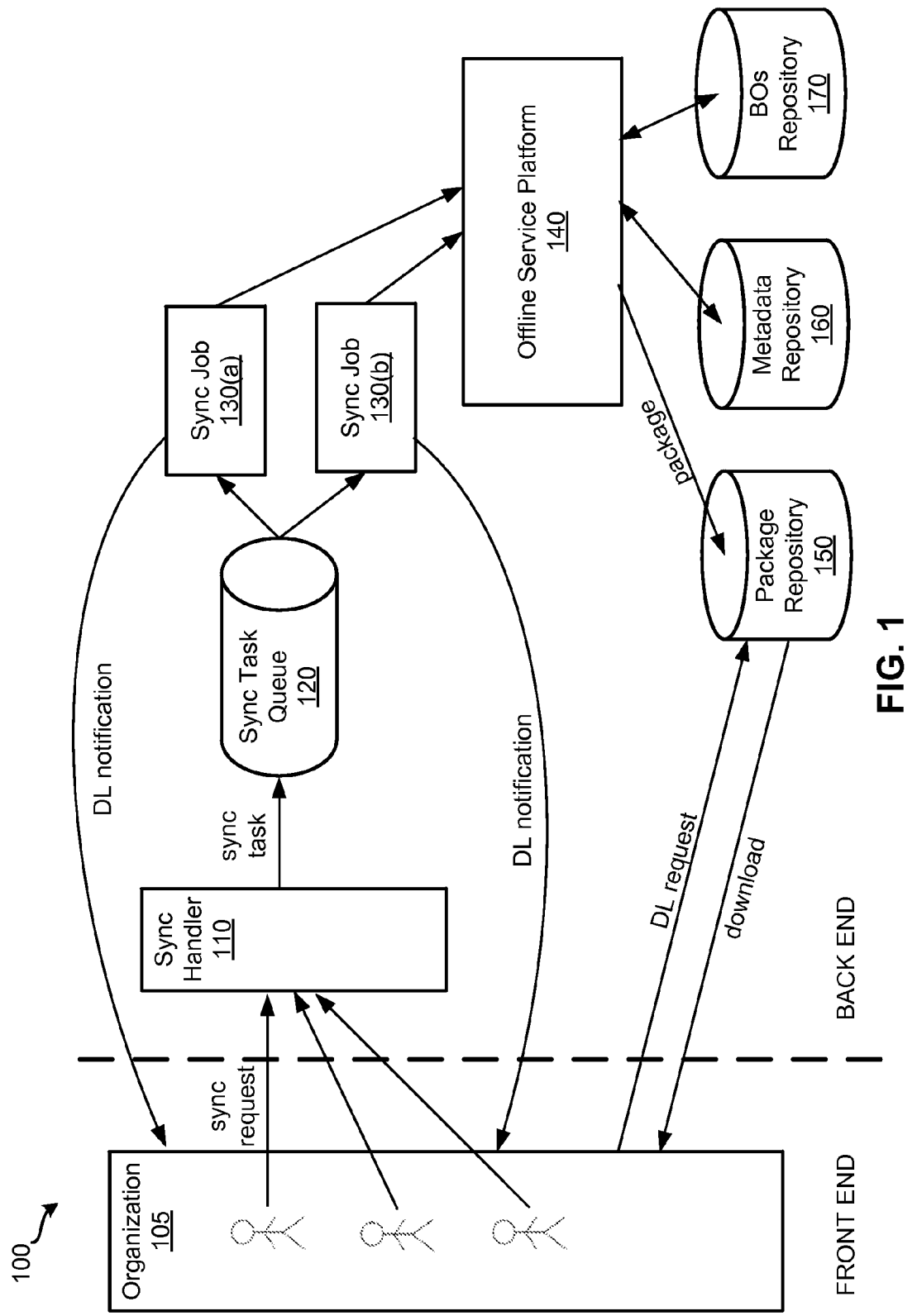
FIG. 1 illustrates a system according to one embodiment.

FIG. 1 illustrates system 100 according to one embodiment. System 100 includes multiple components on the backend that together provide offline support to users in an organization. System 100 includes organization 105 which consists of multiple users. Each user can be an employee of the organization that desires offline support for a business application. The users of organization 105 and the electronic devices they use to communicate with the backend are considered part of the front end. Sync requests are transmitted from users (more specifically user devices) in the frontend to the backend for processing. For example, a portable electronic device of the user can transmit a sync request to the backend. Once the sync request is transmitted, the portable electronic device can terminate the connection with the backend and continue with other operations. Once the backend has fulfilled the request by generating a package of the desired content, the portable electronic device can receive a notification from the backend that the package is ready. In response to receiving the notification, the portable electronic device can reestablish communication with the backend to download the package.

The backend of system 100 includes sync handler 110. Sync handler 110 is configured to generate a sync task for each sync request received. The sync task can include parameters that specify the contents of the package to be generated. In one embodiment, sync handler 110 can retrieve the parameter from the sync request. In another embodiment, sync handler 110 can communicate with an employee database (not shown) to retrieve a predefined parameter. Sync handler 110 can use the parameters to define the sync task.

System 100 further includes sync task queue 120. Sync task queue 120 receives sync tasks and creates a sync job for each sync task output from sync task queue 120. In some embodiments, sync tasks can output sync task queue 120 when system resources become available. In one example, the resources of system 100 may be capable of processing a predefined number of sync jobs at the same time in parallel. In another example, sync task queue 120 can monitor the resources of system 100 and create new sync jobs depending on available resources. In one embodiment, sync task queue 120 can output sync tasks using a first in, first out algorithm. In another embodiment, sync task queue 120 can analyze the sync tasks and rearrange the sync tasks in the queue based on different methodologies. For example, sync tasks that require less time to perform may move up the queue in front of sync tasks that require more time to perform. The period of time required to perform a sync task can be determined by a variety of factors, including whether a package already exists in package repository 150 for the user associated with the sync task (since generating a package containing the delta of changes since the last package can contain less content), the amount of content requested (based on time frame or services requested), or user priority (e.g., perform sync tasks from executives before sync tasks from staff). As shown here, sync task queue 120 can generate sync jobs 130(*a*) and 130(*b*).

Sync job 130 is configured to generate a package from content stored in metadata repository 160 and BOs repository 170. In some embodiments, offline service platform 140 can provide algorithms that are used by sync job 130 to collect content from various data sources and to generate the package. Offline service platform 140 can contain an algorithm that defines how the package is generated for each service, product, and application being handled by system 100. The algorithm can also specify that the generated package is stored in package repository 150. In one embodiment, offline service platform 140 can support plugin mechanisms that allow backend developers to implement new offline objects or algorithms.

When sync job 130 finishes generating a package for a sync task, sync job 130 transmits a download notification back to the portable electronic device that belongs to the user that corresponds with the sync task, thereby notifying the user that the package is ready. The user who receives the download notification can re-establish communication with the backend and transmit a download request to retrieve the package. Advantages to re-establishing communication with the backend when the package is ready rather than maintaining an active communication channel during the creation of the package can include reducing bandwidth usage of system 100, freeing up resources on user devices to perform other tasks on the user device, and preventing timeouts on the user device as the device waits to receive the content. In one embodiment, the download notification can contain a unique identifier which the user transmits back to retrieve the desired package. The package is then transmitted from package repository 150 to the user. In other embodiments, the components of system 100 can be interconnected in a different orientation.

Figure 2:
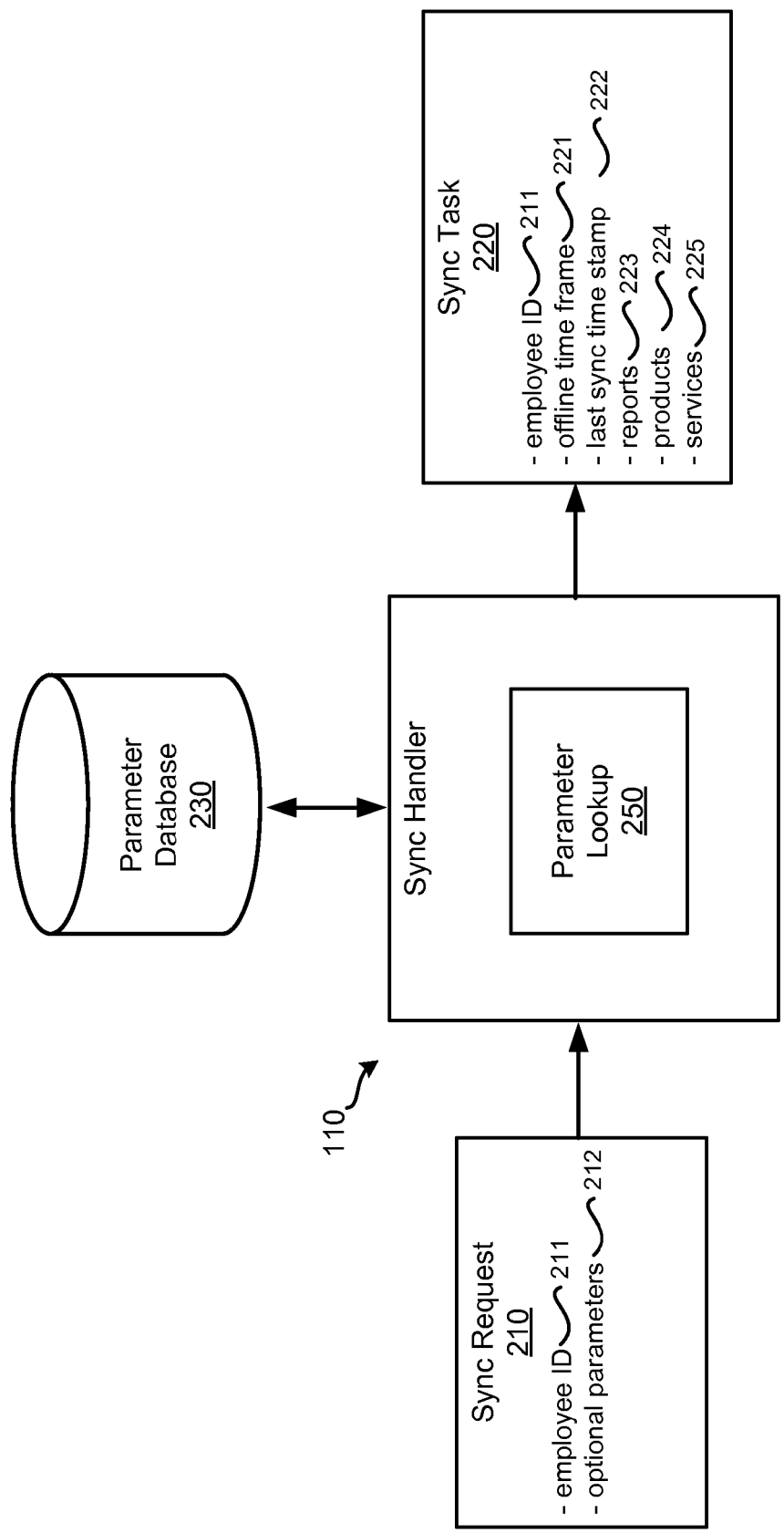
FIG. 2 illustrates an example of a sync handler according to one embodiment.

FIG. 2 illustrates an example of sync handler 100 according to one embodiment. Sync handler 110 is configured to generate sync task 220 after receiving sync request 210. Sync request 210 can include one or more parameters that are used by sync handler 110 to generate sync task 220. Some of the parameters can be required while others can be optional. In one embodiment, an employee ID 211 can be a required parameter in sync request 210. Employee ID 211 can uniquely identify the user of organization 105 who is submitting the sync request. This information not only allows sync handler 110 to determine additional parameters for the user, but also allows system 100 to identify the owner of the package when the package is generated. Sync request 210 can also include one or more optional parameters 212, some of which are described below. Optional parameters 212, when included in sync request 210, can override predefined parameters that are associated with employee ID 211.

Sync handler 110 includes parameter lookup 250. Parameter lookup 250 is configured to retrieve predefined parameters from parameter database 230. Parameter database 230 can store one or more parameters for each user. The parameters can define a configuration for a particular user. For example, the configuration can specify that the products, services, tools, or applications that the user is using. As another example, the configuration can specify the preferences of the user when operating in offline mode. For instance, a user can by default request to download content that may be accessed by a user application the week before and the week after (two week time frame). In one embodiment, parameter lookup 250 can retrieve the predefined parameters according to employee ID 211. Sync handler 110 can in turn use the retrieved parameters along with the optional parameters 212 to generate sync task 220.

Sync task 220 can include a list of parameters. Some of the parameters can be from sync request 210 while other parameters (e.g., predefined parameters) can be from parameter database 230. In one embodiment, sync handler 110 can give precedence to parameters provided from sync request 210 over predefined parameters having the same name provided from parameter database 230. In other words, optional parameters 212 in sync request 210 can override predefined parameters in parameter database 230 when sync task 220 is generated. For example, a first setting for an offline-time frame parameter that is part of optional parameters 212 can be used over a second setting for a parameter having the same name from parameter database 230.

The predefined parameters from parameter database 230 which can form part of sync task 220 include offline time frame 221. Offline time frame 211 defines a period of time in which the user expects to use the portable electronic device in an offline mode. By setting offline time frame 211, content that is relevant to user during that time frame (or content that the user may access during the time frame) can be identified as content to include in the package.

Parameter database 230 can also include last sync time stamp 222. Last sync time stamp 222 defines the time when the last sync request was performed for the user. In one example, this can be the time when the last package was generated for the user. By providing last sync time stamp 222 in sync task 220, the sync job can focus on packaging content which has changed since the last update when processing sync task 220. In one embodiment, content which matches the search criteria but was provided in the last sync can be skipped. This can avoid the redundant transmission of content that has previously be delivered to the user, thus resulting in a smaller package. Smaller packages can reduce storage space used in package repository 150 and can reduce bandwidth usage when the package is delivered to the user.

Parameter database 230 can also include reports 223, products 224, and services 225. These parameters can be used to specify the reports, products, and services (respectively) that the user would like to sync. In one embodiment, reports, products, and services provided as optional parameters 212 in sync request 210 can be combined with reports, products, and services provided in parameter database 230. In another embodiment, reports, products, or services in parameter database 230 can be skipped when they are provided optional parameters 212 of sync request 210.

Figure 3:
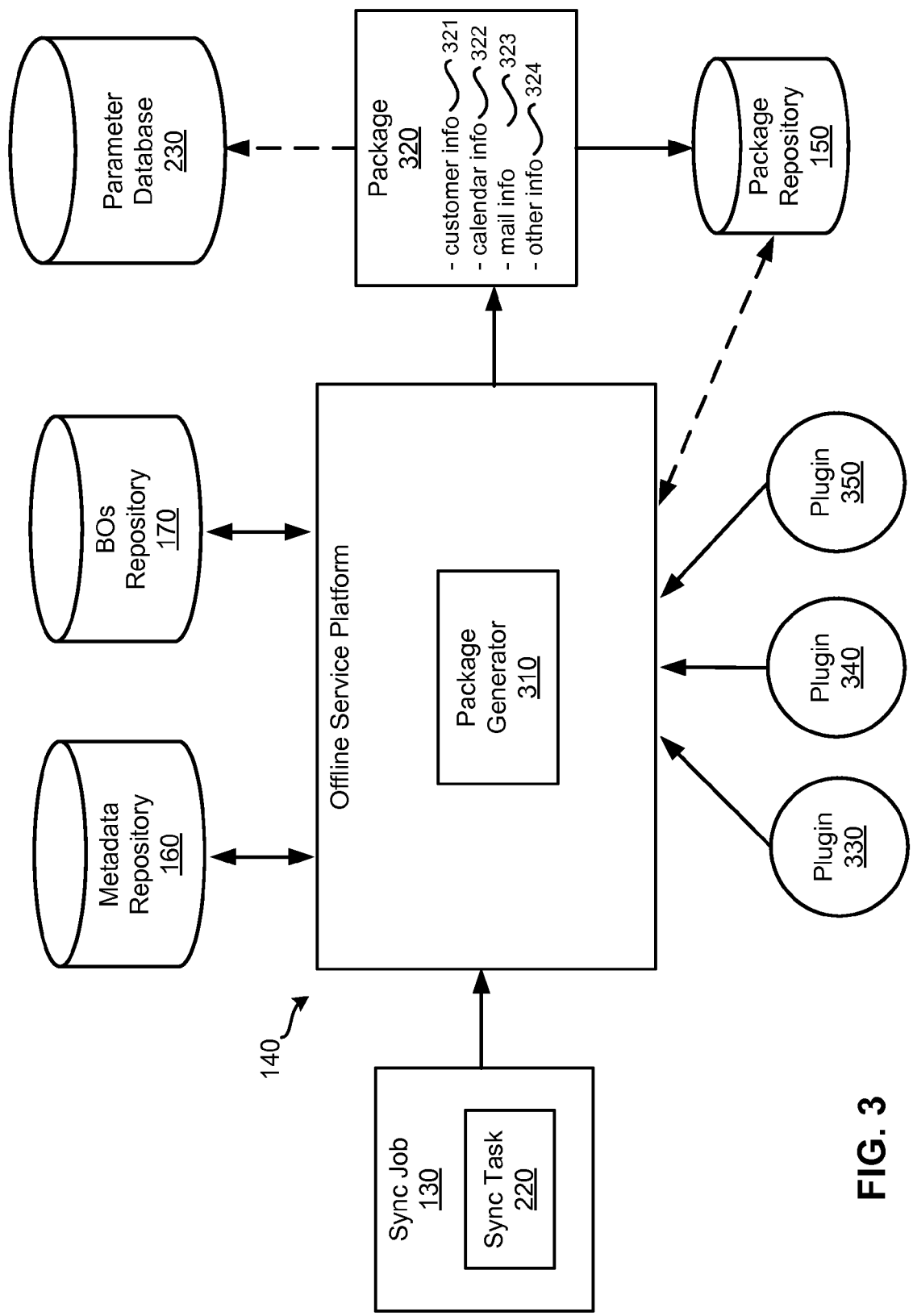
FIG. 3 illustrates an example of offline service platform according to one embodiment.

FIG. 3 illustrates an example of offline service platform 140 according to one embodiment. Offline service platform 140 is configured to provide the logic that is used by sync job 130 when processing sync task 220. Offline service platform 140 includes package generator 310. Package generator 310 selects the logic according to the parameters in sync task 220. In one embodiment, package generator 310 can select a plugin from plugins 330, 340, and 350 to apply in sync job 130 based on a report, package, or service listed in sync task 220. For example, package generator 310 can select plugin 330 when a calendar service is specified in sync task 220. In some examples, additional plugins can be implemented by backend developers and offered through offline service platform 140. Sync job 130 can generate package 320 according to the logic provided by selected plugins. The generation of package 320 can include content retrieval from metadata repository 160 and BOs repository 170.

Package 320 can include content that would allow the user to operate the user's electronic device in an offline mode. In one embodiment, package 320 can include customer info 321. Customer info 321 is customer metadata that may be accessed by the user while the user's device is in the offline mode. For example, customer contact information, customer addresses, customer sales information, and other customer related information can be included in package 320. Package 320 further includes calendar info 322. Calendar info 322 is calendar metadata that may be access by the user while the user's device is in the offline mode. For example, meeting information and task information can be included in package 320. Package 320 further includes mail info 323. Mail info 323 is content from a mail application that may be accessed by the user while the user's device is in the offline mode. For example, the user's mail for the past two weeks can be included in the package. Other info 324 that can be useful to the user while operating the user device in an offline mode can also be included.

In some embodiments, the content that is included in package 320 can be confined by parameters in sync task 220. In one embodiment, sync job 130 can confine the content in package 320 according to restrictive parameters provided in sync task 220. For example, offline time frame 221 can specify that the user plans on being in an offline mode for a week. As a result, customer info 321 and calendar info 322 can be restricted to content that falls within the window of time specified by the time frame. Similarly, last sync time stamp 222 can specify the time that the last package was generated. Thus, content for customer info 321, calendar info 322, and mail info 323 having a last modified time stamp that is older than the last sync time stamp 222 was previously delivered in the previous package. The logic may generate a current package that skips previously delivered content, thereby minimizing the amount of repetitive content that is transmitted to the user device. Once package 320 has been generated, package 320 can be stored in repository 150.

In one embodiment, offline service platform 140 can optionally retrieve package information from package repository 150 to identify what has already been included in a previously delivered package. This can allow information that has been previously delivered to a user to not be included in a currently generated package to the same user. As a result, the delta changes since the last delivered package will be provided in the current package. In another embodiment, generated package 320 can optionally be used to refine parameter database 230. For example, offline time frame 221, last sync time stamp 222, and other parameters can be updated upon the generation of package 320.

Figure 4:
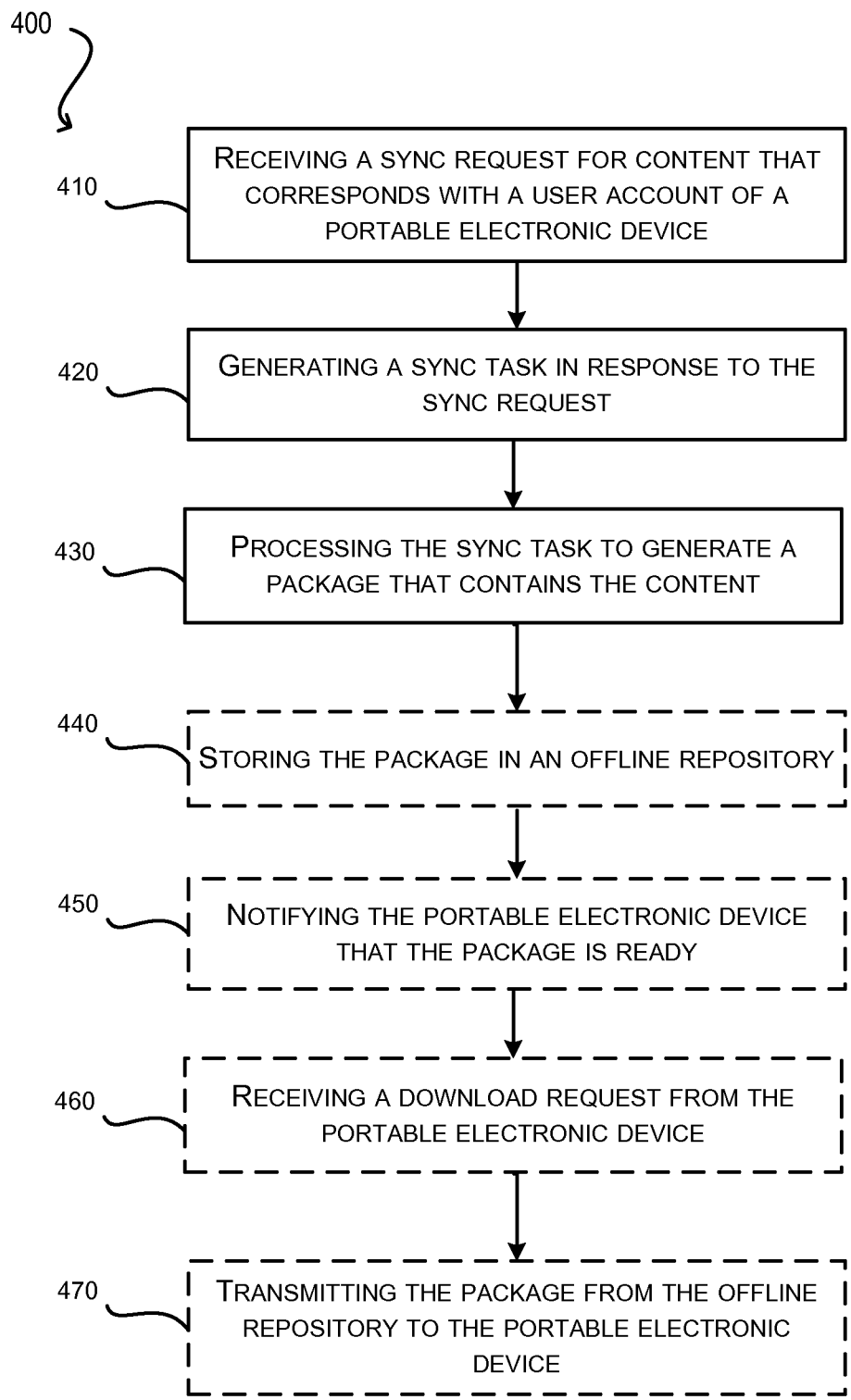
FIG. 4 illustrates a process flow for syncing content with a portable electronic device according to one embodiment.

FIG. 4 illustrates a process flow for syncing content with a portable electronic device according to one embodiment. Process 400 can be stored in computer readable medium and executed by a processor. In one embodiment, the processor can belong to a backend server in system 100 of FIG. 1. Process 400 begins by receiving a sync request for content that corresponds with a user account of a portable electronic device at 410. The content can be configured to allow a user to operate the portable electronic device in an offline mode where the portable electronic device is not in communication with the backend server. In one example, a user can instruct the portable electronic device to generate a sync request and transmit the sync request to the backend server. The sync request can include various parameters, some of which are required. For example, an employee ID that uniquely identifies the user can be required.

After receiving the sync request, process 400 continues by generating a sync task in response to the sync request. The sync task can be generated base on parameters provided in the sync request. In one embodiment, additional predefined parameters that are associated with the user account can be retrieved from a parameter database and used to generate the sync task. For example, generating the sync task can include identifying an employee ID from the sync request, retrieving a default parameter associated with the employee ID, and storing the retrieved default parameter as part of the sync task.

After generating the sync task, process 400 can continue by processing the sync task to generate a package that contains the content at 430. In one embodiment, a sync job can be created to process the sync task. The sync job can access one or more data sources to retrieve the content according to logic or algorithms specified by the sync task. In one example, processing the sync task can include identifying a service that is associated with the user account, retrieving a plugin that corresponds with the service, and processing the sync task with the plugin to generate the package. In another example, processing the sync task can include determining a last update time stamp associated with the user account, retrieving data associated with the user account having a time stamp more recent that the last update time stamp, and packaging the data into the package. The last update time stamp can be determined by identifying a previously generated package associated with the user account from an offline repository and retrieving the last update time stamp from the previously generated package. In yet another example, processing the sync task can include determining a time frame that the portable electronic device will be operating in the offline mode and retrieving the content according to the time frame. In yet other examples, a combination of these techniques can be applied when processing the sync task.

After processing the sync task, process 400 can optionally continue by storing the package in an offline repository at 440. In one embodiment, the offline repository can be configured to store one package for each user. When a new package is stored in offline repository, a previously generated package can be deleted. In another embodiment, the offline repository can be configured to store an original package for each user plus multiple additional packages which store the delta changes. Together, the original package and the additional packages can represent the entire package for the user. In yet another embodiment, the offline repository can be configured to store packages for a predefined period of time. For example, packages in the offline repository can be deleted once the package is over a week old.

Once the package has been stored, process 400 can optionally continue by notifying the portable electronic device that the package is ready at 450. The notification can be transmitted to the user as a push notification, email, or other form of notification. Sometime after notifying the portable electronic device, process 400 can optionally continue by receiving a download request from the portable electronic device. The download request can include the employee ID associated with the user account. The employee ID can be utilized to identify the package the deliver to the user.

Once the download request is received, process 400 can optionally continue by transmitting the package from the offline repository to the portable electronic device. In one embodiment, one or more packages can be transmitted to the portable electronic device.

Figure 5:
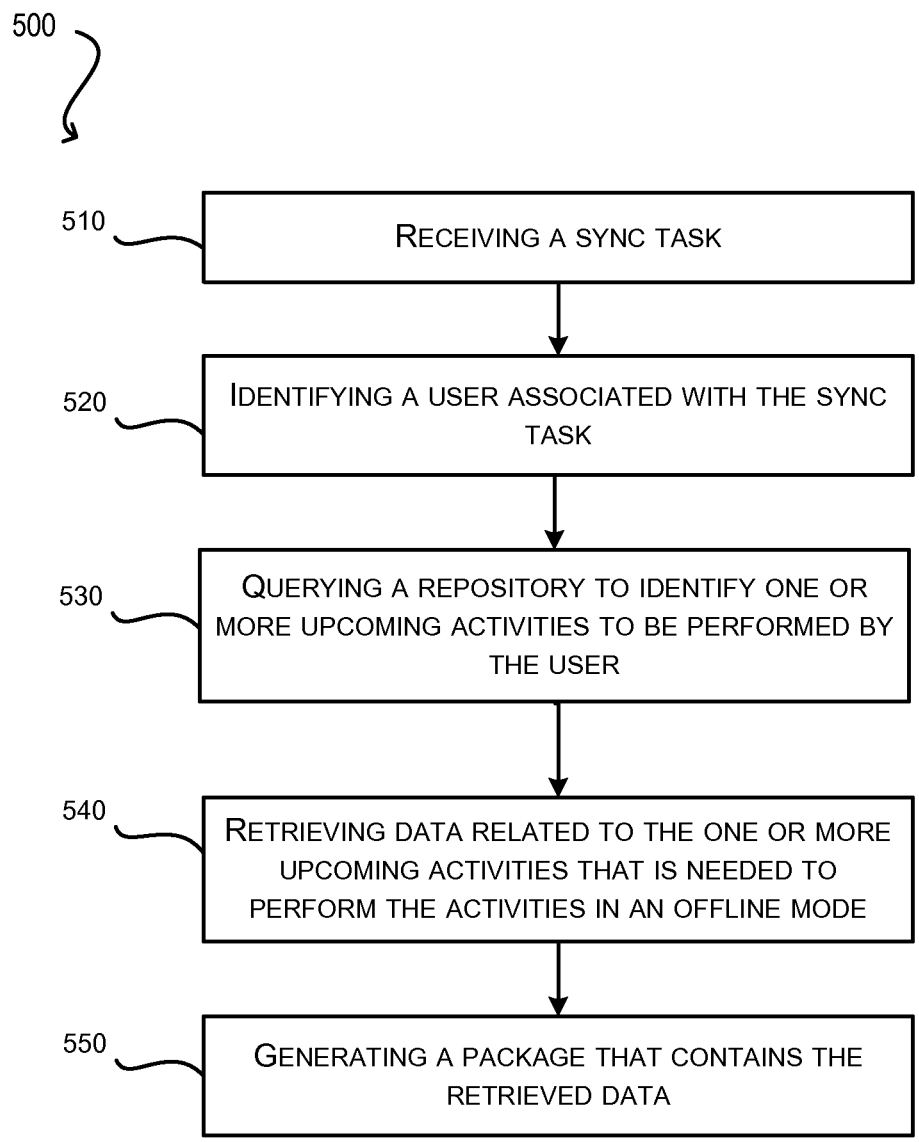
FIG. 5 illustrates a process flow for generating a package according to one embodiment.

FIG. 5 illustrates a process flow for generating a package according to one embodiment. Process 500 can be stored in computer readable medium and executed by a processor. In one embodiment, the package generator 310 of FIG. 3 can perform the process flow to generate package 320. Process 500 begins by receiving a sync task at 510. Once the sync task is received, process 500 can identify a user associated with the sync task. Identification of the user can be by an employee ID stored in the sync task. In other embodiments, the role of the user or the user ID can be identified by querying an employee database.

Once the user is identified (and optionally the user's role), process 500 can continue by querying a repository to identify one or more upcoming activities to be performed by the user at 530. In one embodiment, a query can be performed on a repository storing calendar data. Appointments and activities that are associated with the user and that fall within a predefined period of time can be retrieved. For example, the user's upcoming activities for the next week can be identified. In some examples, activities and appointments for a particular user role can also be identified. For example, process 500 can identify upcoming activities that are associated for a particular type of user, such as a salesperson. For instance, weekly meetings or salesperson conferences can also be identified according to the user rule.

Once the upcoming activities have been identified, process 500 can continue by retrieving data (e.g., business data and metadata) related to the upcoming activities at 540. The data retrieved can be data that is needed to perform the activities in an offline mode. For example, customer contact information, customer surveys, and customer spreadsheets to perform tasks such as inventory and profits can be retrieved. Once the data has been retrieved, process 500 can generate a package that contains the retrieved data at 550.

In some embodiments, plugin 330, 340, or 350 can generate the data for the offline mode and offline service platform 140 can collect the data from the plugins to generate the package and persist the package into package repository 150. In one example, the package can be a zip file that includes business data files, metadata files, and timestamp files. Business data files can contain the content of business data. Metadata files can describe the business data metadata information. Timestamp files can contain the timestamp of the finishing time of the last sync task. The timestamp can be used to request for data that has changed since the timestamp. In one specific example, the package file can be called "offline.zip" and contain "account.data", "account.metadata", "contact.data", "contact.metadata", and "timestamp.txt" files.

In one specific example, a user may be an inventory checker who visits customers on a weekly basis. The user can submit a sync task which gets queued and eventually processed by package generator 310. Package generator 310 can identify the user associated with the sync task and identify activities associated with the salesperson. For example, package generator 310 can identify that the user is an inventory checker and that the user plans to operate in an offline mode for the next seven days. Package generator 310 can query a repository to identify four stores that the inventory checker has scheduled to visit over the next seven days and optionally the activities the inventory checker is to perform as each store. For instance at a first store which is a restaurant, the stock checker may be scheduled to conduct a survey and take new orders. At a second store which is a supermarket, the stock checker may be scheduled to take inventory. Once the activities have been identified, package generator 310 can retrieve data related to the upcoming activities that is needed to perform the activities in an offline mode. For instance, the survey form needed to conduct the survey, an order form needed to take new orders, and an inventory form needed to mark inventory can be retrieved. Package generator can generate a package that includes the retrieved data.

Figure 6:
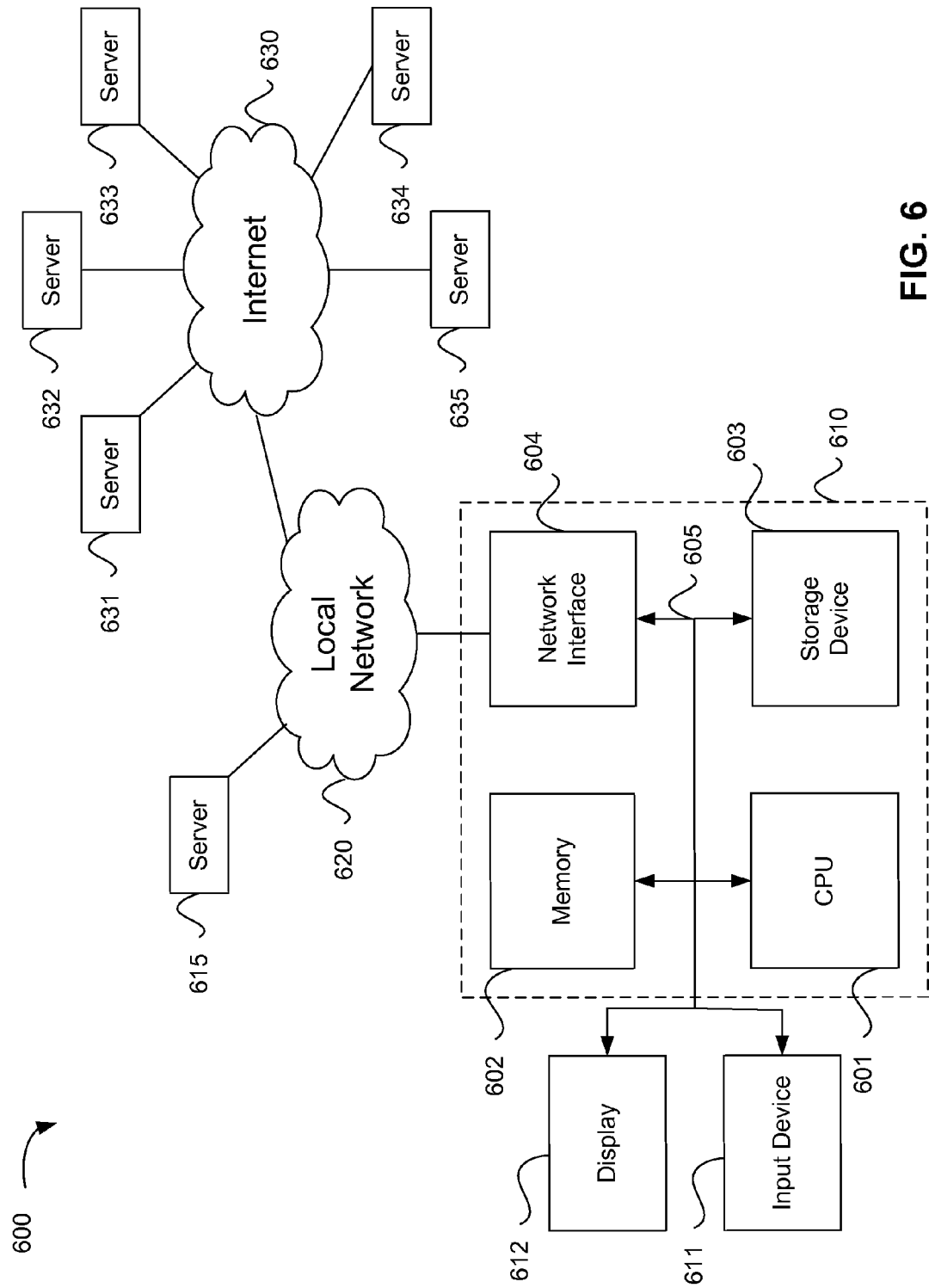
FIG. 6 illustrates an exemplary computer system according to one embodiment.

An exemplary computer system 600 is illustrated in FIG. 6. Computer system 610 includes bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   receiving, from a portable electronic device, a sync request for content stored on a computer system, the sync request comprising an employee identifier and a first setting of a parameter associated with the employee identifier, the content corresponding with a user account of the portable electronic device and being configured to allow the user account to operate an application executable on the portable electronic device in an offline mode where the portable electronic device is not in communication with the computer system;
   generating, by the computer system, a sync task in response to the sync request by retrieving, from a database, a set of default parameters associated with the employee identifier comprising a second setting of the parameter and storing the first setting of the parameter associated with the employee identifier, the set of default parameters, but not the second setting of the parameter, as part of the sync task;
   processing, by the computer system, the sync task to generate a package that contains the content by identifying a service from the sync task that is associated with the user account, retrieving a plugin that corresponds with the service; and applying the plugin to the sync task to generate the package;
   storing, by the computer system, the package in an offline repository;
   notifying, by the computer system, the portable electronic device that the package is ready;
   receiving, by the computer system, a download request from the portable electronic device; and
   transmitting, by the computer system, the package from the offline repository to the portable electronic device in response to the download request.

2. The computer-implemented method of claim 1, wherein processing the sync task comprises:
   retrieving, by the computer system, metadata from a first repository comprising customer metadata and calendar metadata;
   retrieving, by the computer system, a set of business objects from a second repository comprising a plurality of business objects; and
   including the metadata and the set of business objects in the package.

3. The computer-implemented method of claim 1, wherein the set of default parameters associated with the employee identifier further comprises a last update time stamp associated with the user account, wherein processing the sync task comprises retrieving, by the computer system, the content associated with the user account having a time stamp more recent that the last update time stamp.

4. The computer-implemented method of claim 3, wherein generating the sync task further comprises:
   identifying, by the computer system, a previously generated package associated with the user account from the offline repository; and
   retrieving, by the computer system, the last update time stamp from the previously generated package.

5. The computer-implemented method of claim 1, wherein the set of default parameters associated with the employee identifier further comprises a time frame that the portable electronic device will be operating in the offline mode, wherein processing the sync task comprises retrieving, by the computer system, the content according to the time frame.

6. A non-transitory computer readable storage medium storing one or more programs, the one or more programs comprising instructions for:
   receiving, from a portable electronic device, a sync request for content stored on a computer system, the sync request comprising an employee identifier and a first setting of a parameter associated with the employee identifier, the content corresponding with a user account of the portable electronic device and being configured to allow the user account to operate an application executable on the portable electronic device in an offline mode where the portable electronic device is not in communication with the computer system;
   generating a sync task in response to the sync request by retrieving, from a database, a set of default parameters associated with the employee identifier comprising a second setting of the parameter and storing the first setting of the parameter associated with the employee identifier, the set of default parameters, but not the second setting of the parameter, as part of the sync task;
   processing the sync task to generate a package that contains the content by identifying a service from the sync task that is associated with the user account, retrieving a plugin that corresponds with the service; and applying the plugin to the sync task to generate the package;
   storing the package in an offline repository;
   notifying the portable electronic device that the package is ready;
   receiving a download request from the portable electronic device; and
   transmitting the package from the offline repository to the portable electronic device in response to the download request.

7. The non-transitory computer readable storage medium of claim 6, wherein processing the sync task comprises:

retrieving metadata from a first repository comprising customer metadata and calendar metadata;

retrieving a set of business objects from a second repository comprising a plurality of business objects; and including the metadata and the set of business objects in the package.

8. The non-transitory computer readable storage medium of claim 6, wherein the set of default parameters associated with the employee identifier further comprises a last update time stamp associated with the user account, wherein processing the sync task comprises retrieving the content associated with the user account having a time stamp more recent that the last update time stamp.

9. The non-transitory computer readable storage medium of claim 8, wherein generating the sync task further comprises:

identifying a previously generated package associated with the user account from the offline repository; and retrieving the last update time stamp from the previously generated package.

10. The non-transitory computer readable storage medium of claim 6, wherein the set of default parameters associated with the employee identifier further comprises a time frame that the portable electronic device will be operating in the offline mode, wherein processing the sync task comprises retrieving the content according to the time frame.

11. A computer implemented system, comprising:

one or more computer processors; and a non-transitory computer-readable storage medium comprising instructions, that when executed, control the one or more computer processors to be configured for:

receiving, from a portable electronic device, a sync request for content stored on a computer system, the sync request comprising an employee identifier and a first setting of a parameter associated with the employee identifier, the content corresponding with a user account of the portable electronic device and being configured to allow the user account to operate an application executable on the portable electronic device in an offline mode where the portable electronic device is not in communication with the computer system;

generating a sync task in response to the sync request by retrieving, from a database, a set of default parameters associated with the employee identifier comprising a second setting of the parameter and storing the first setting of the parameter associated with the employee identifier, the set of default parameters, but not the second setting of the parameter, as part of the sync task; and processing the sync task to generate a package that contains the content by identifying a service from the sync task that is associated with the user account, retrieving a plugin that corresponds with the service; and applying the plugin to the sync task to generate the package;

storing the package in an offline repository;

notifying the portable electronic device that the package is ready;

receiving a download request from the portable electronic device; and transmitting the package from the offline repository to the portable electronic device in response to the download request.

12. The computer implemented system of claim 11, wherein processing the sync task comprises:

retrieving metadata from a first repository comprising customer metadata and calendar metadata;

retrieving a set of business objects from a second repository comprising a plurality of business objects; and including the metadata and the set of business objects in the package.

13. The computer implemented system of claim 11, wherein the set of default parameters associated with the employee identifier further comprises a last update time stamp associated with the user account, wherein processing the sync task comprises retrieving the content associated with the user account having a time stamp more recent that the last update time stamp.

14. The computer implemented system of claim 13, wherein generating the sync task further comprises:

identifying a previously generated package associated with the user account from the offline repository; and retrieving the last update time stamp from the previously generated package.

15. The computer implemented system of claim 11, wherein the set of default parameters associated with the employee identifier further comprises a time frame that the portable electronic device will be operating in the offline mode, wherein processing the sync task comprises retrieving the content according to the time frame.

* * * * *